R. W. STEPHENS.
STRAIN INDICATOR SUPPORT FOR DRILLING RIGS.
APPLICATION FILED NOV. 1, 1911.
1,091,599.
Patented Mar. 31, 1914.
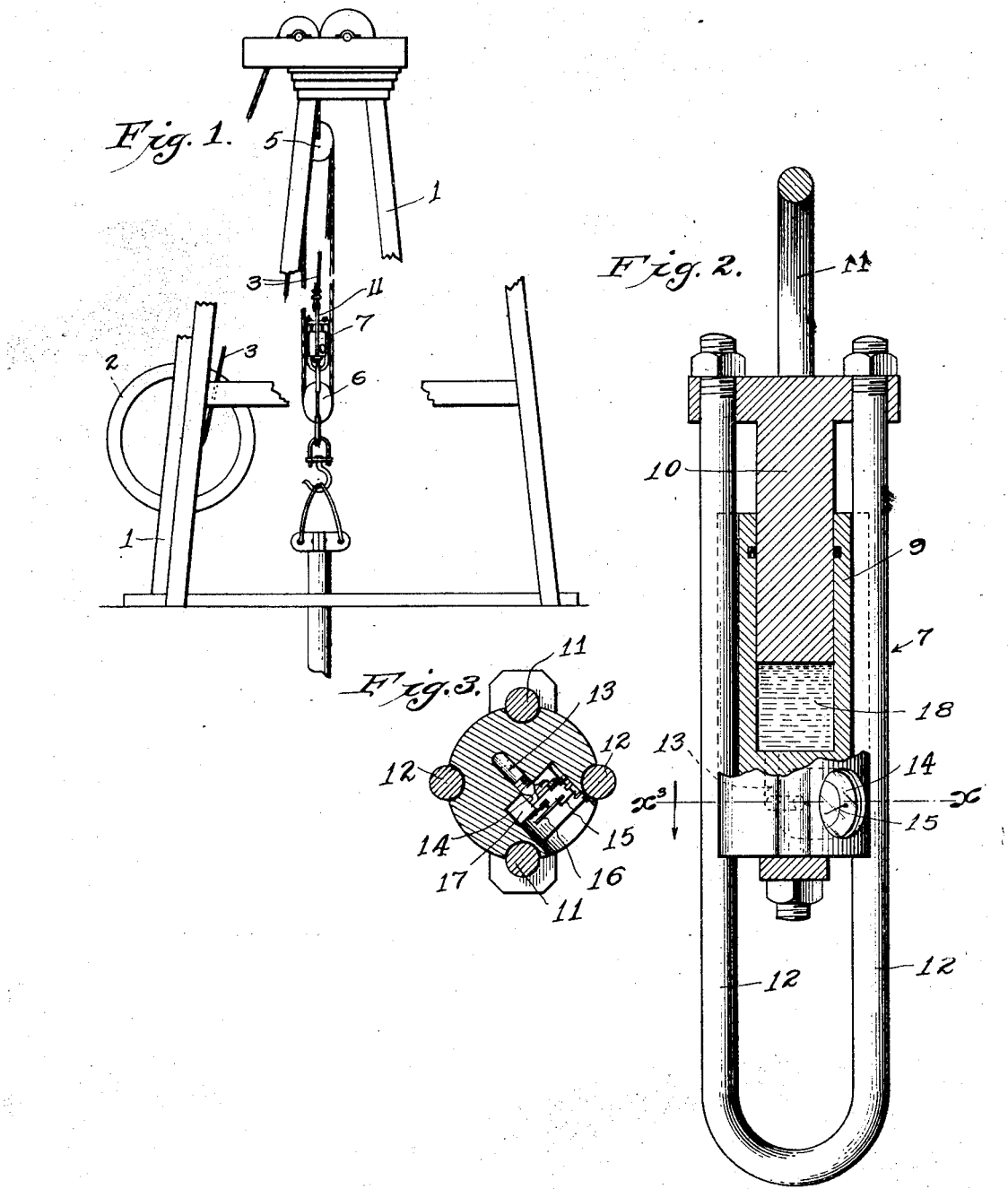
Witnesses:
Inventor:
Roscoe William Stephens.

UNITED STATES PATENT OFFICE.

ROSCOE WILLIAM STEPHENS, OF MARICOPA, CALIFORNIA.

STRAIN-INDICATOR SUPPORT FOR DRILLING-RIGS.

1,091,599. Specification of Letters Patent. Patented Mar. 31, 1914.

Application filed November 1, 1911. Serial No. 658,056.

*To all whom it may concern:*

Be it known that I, ROSCOE WILLIAM STEPHENS, a citizen of the United States of America, residing at Maricopa, in the county of Kern and State of California, have invented a new and useful Improvement in Strain-Indicator Supports for Drilling-Rigs, of which the following is a specification.

This invention relates to improved means for supporting the means for indicating the strain exerted by a casing while it is being lowered into or drawn from a well, whereby the ropes of the tackle provide a protection to the indicator support.

The accompanying drawings illustrate the invention, and referring thereto:

Figure 1 is a side elevation of a portion of the well drilling rig, showing the application of the invention thereto. Fig. 2 is a vertical section of the dynamometer or strain indicator support and self contained indicator which I employ in the present instance. Fig. 3 is a horizontal section on line $x^3$—$x^3$ in Fig. 2.

1 designates the derrick of a well drilling rig which is assumed to be provided with the usual appliances for operating the drilling tools, and is further provided with the usual calf wheel 2, cable or line 3 operated thereby, and upper and lower pulley blocks 5 and 6 respectively over which the line 3 runs to provide a pocket between the pulley blocks, said line serving for suspending the casing and raising and lowering the same. The dynamometer or strain indicator support designated at 7, is located in the pocket of the operative line or casing suspending means, in the connection between the line 3 and the lower pulley block 6, this being the most convenient location and requiring a comparatively small and light strain indicator support as the strain on the line 3 is only a fractional part of the tool strain or weight developed by the casing and the ropes of the tackle provide a protection to the indicator support. It will be understood that in this case the indications of the strain indicator will be multiplied by the proper factor in order to give the strain or weight of the casing according to the number of runs in the line 3 between the upper and lower pulleys, and the diameter of the pistons in the strain indicator.

The dynamometer or strain indicator may be of any suitable type, but is preferably of the hydraulic type disclosed in my application, Serial No. 658,055, filed Nov. 1, 1911, comprising, for example, a cylinder 9 in which slides a piston 10, said cylinder being supported on an inverted stirrup or reins 11, adapted for engaging with the line 3 and the piston being connected to U-shaped stirrup or reins 12 adapted for connection to the lower block 6. The lower end of the cylinder 9 is formed with a recess 13 establishing communication from a cylinder to a pressure gage 14, said pressure gage being of any suitable type and operating a pointer, indicator or pencil 15 which moves over a dial 16. Said dial is preferably mounted on a time mechanism or clock work 17, so as to provide for recording as well as indicating the pressure within the cylinder.

The operation is as follows: When the casing is being raised or lowered by its suspending means above described, the strain on the operating line 3 is indicated by the hydraulic strain indicator above described, the pressure on the line being communicated through the respective members 11 and 12 to the cylinder 9 and piston 10, and causing pressure to be placed on the liquid indicated at 18 contained in said cylinder, and said pressure is communicated to the pressure gage and is indicated by the indicator pointer 15 and recorded on the dial 16, so that the operator is constantly informed of the tension which he is putting on the apparatus and by proper computation, as to the strain on the suspended casing. Moreover, a record is provided by which any lack of proper operation in the sinking of the casing becomes evident.

In case the casing parts or pulls in two, the indicator records the amount of strain, giving a basis for claim against the manufacturer of the casing. Also by recording amount of strain exerted on casing at all times, the device gives almost a complete record of work accomplished by operator. For instance,—on rotary pipe will indicate time of actual drilling and also time consumed in pulling out to renew rotary bits and running in again, and thus will indicate whether or not work was carried on continuously; and same will apply to standard drilling methods when lowering or withdrawing casing. The device also indicates at what hour of day work was started and suspended and the number of joints of casing lowered.

What I claim is:

A strain indicator support for drilling rigs comprising a suspension means having lower and upper pulley blocks and tackle ropes extending around the pulley blocks forming a pocket between the pulley blocks, a lower stirrup connected with the lower pulley block within the pocket and an inverted stirrup connected with the tackle rope from the upper pulley block within the pocket and crossing the arms of the lower stirrup; the tackle ropes providing a protection to the indicator support.

In testimony whereof, I have hereunto set my hand at Maricopa California, this 18th day of October, 1911.

ROSCOE WILLIAM STEPHENS.

In presence of—
W. F. ROBERTSON,
H. F. MITCHELL.